United States Patent
Watarai et al.

(10) Patent No.: US 9,469,063 B2
(45) Date of Patent: Oct. 18, 2016

(54) CLAMPING DEVICE AND MOLDING APPARATUS

(71) Applicant: Toshiba Kikai Kabushiki Kaisha, Chiyoda-ku, Tokyo (JP)

(72) Inventors: Kohei Watarai, Zama (JP); Daisuke Yasuda, Zama (JP)

(73) Assignee: TOSHIBA KIKAI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/961,560

(22) Filed: Dec. 7, 2015

(65) Prior Publication Data

US 2016/0158984 A1  Jun. 9, 2016

(30) Foreign Application Priority Data

Dec. 8, 2014 (JP) ................. 2014-247983

(51) Int. Cl.
*B29C 45/64* (2006.01)
*B29C 45/68* (2006.01)
*B29C 33/20* (2006.01)
*B29C 45/67* (2006.01)

(52) U.S. Cl.
CPC ............ *B29C 45/68* (2013.01); *B29C 33/202* (2013.01); *B29C 45/641* (2013.01); *B29C 45/6721* (2013.01); *B29C 45/6728* (2013.01); *B29C 45/6778* (2013.01); *B29C 2045/642* (2013.01); *B29C 2045/688* (2013.01)

(58) Field of Classification Search
CPC ............ B29C 45/641; B29C 45/6721; B29C 45/6728; B29C 45/6778; B29C 2045/642; B29C 33/202
See application file for complete search history.

(56) References Cited

U.S. PATENT DOCUMENTS

| | | | | |
|---|---|---|---|---|
| 4,874,309 | A * | 10/1989 | Kushibe | B29C 45/6728 425/589 |
| 5,192,557 | A * | 3/1993 | Hirata | B29C 45/1761 425/450.1 |
| 2003/0217829 | A1 | 11/2003 | Baron | |
| 2005/0226957 | A1 | 10/2005 | Tsuji | |

FOREIGN PATENT DOCUMENTS

| | | |
|---|---|---|
| JP | H02-018009 | 1/1990 |
| JP | 2003-334648 | 11/2003 |
| JP | 2005-297020 | 10/2005 |

OTHER PUBLICATIONS

English Language Abstract and Translation of JP 2003-334648 published on Nov. 25, 2003.
English Language Abstract and Translation of JP 2005-297020 published on Oct. 27, 2005.
English Language Abstract of JP H02-018009 published on Jan. 22, 1990.

* cited by examiner

*Primary Examiner* — James Mackey
(74) *Attorney, Agent, or Firm* — DLA Piper LLP US

(57) ABSTRACT

The clamping device has tie bars which are connected to a fixed platen and have engaged parts at a movable platen side, clamping cylinders which are provided on movable platens, half nut devices which are connected to pistons of the clamping cylinders and can mesh with the engaged parts, and stopper devices which restrict the movement of the half nut devices. Each stopper device has at least a driving unit and a stopper part which is driven in a mold opening and closing direction relative to the movable platen by driving of the driving unit and can engage with the half nut device from the fixed platen side. No winding transmission mechanism is interposed between the driving unit and the stopper part.

6 Claims, 5 Drawing Sheets

CLAMPING DEVICE AND MOLDING APPARATUS

TECHNICAL FIELD

The present invention relates to a clamping device for opening and closing molds and clamping the molds and to a molding apparatus (molding machine). The molding apparatus is for example a die casting machine or an injection molding machine.

BACKGROUND ART

Known in the art is a two-platen type clamping device which executes mold thickness (die height) adjustment at each molding cycle (for example Patent Literature 1 or Patent Literature 2). For example, the clamping device in Patent Literature 1 has a fixed die plate which holds a fixed mold, a movable die plate which holds a movable mold and can move in a mold opening and closing direction, clamping pistons which are built in the fixed die plate, tie bars which are fixed at single ends to the clamping pistons and have male screw-shaped engaged parts at the other ends, and a split nut devices which are connected to the movable die plate and can be engaged/disengaged with respect to the engaged parts of the tie bars. This clamping device, in the molding cycle, first, moves the movable die plate to the fixed die plate side (mold closing direction) to close the molds. At this time, the split nut devices move relative to the tie bars, and then the split nut devices and the engaged parts of the tie bars are relatively positioned in accordance with the mold thickness. Next, the clamping pistons are driven to enable the split nut devices and the engaged parts to mesh with each other by adjusting the positions of the tie bars by a distance of less than 1 pitch of the thread grooves (the mold thickness adjustment is executed). After that, the split nut devices and the engaged parts are meshed with each other and the clamping pistons are driven, whereby the tie bars are extended and molds are clamped.

In Patent Literature 3, stoppers are provided in order to stabilize the mold thickness adjustment at each molding cycle described above. Specifically, the clamping device in Patent Literature 3 has a fixed die plate which holds a fixed mold, a movable die plate which holds a movable mold and can move in a mold opening and closing direction, clamping pistons which are built in the fixed die plate, tie bars which are connected at single ends to the movable die plate and have male screw-shaped engaged parts at the other ends, and split nut devices which are connected to the clamping pistons and can be engaged/disengaged with respect to the engaged parts of the tie bars. In this clamping device, along with the movement of the movable die plate, the tie bars (engaged parts) move relative to the clamping pistons and split nut devices. The stoppers are adjusted in advance before the molding cycle at positions in accordance with the mold thickness and abut against the clamping pistons so as to position the clamping pistons at positions where the engaged parts and the split nut devices can mesh with each other. Due to this, the relative positions of the split nut devices and the engaged parts when making them mesh with each other are stabilized. Note that, this abutting action is carried out from the sides opposite to the movement directions of the clamping pistons at the time of clamping.

In Patent Literature 3, a plurality of the stoppers are provided corresponding to the plurality of tie bars. The plurality of stoppers are driven in the mold opening and closing direction by transmission of driving force of one stepping motor through a chain to the plurality of stoppers.

CITATIONS LIST

Patent Literature

Patent Literature 1. Japanese Patent Publication No. 2005-297020A
Patent Literature 2. Japanese Patent Publication No. 2003-334648A
Patent Literature 3. Japanese Patent Publication No. 2-18009A

SUMMARY OF INVENTION

Technical Problem

If the relative positions when making the split nut devices and the engaged parts of the tie bars mesh with each other are not suitable, for example, the split nut devices and the engaged parts are liable to be damaged. As a result, for example, a suitable clamping force is liable to no longer be obtained. Accordingly, it is desirable that a clamping device and molding apparatus capable of performing relative positioning of the split nut devices and the engaged parts of the tie bars with a higher accuracy are provided.

Solution to Problem

A clamping device according to one aspect of the present invention has a fixed platen, a movable platen movable in a mold opening and closing direction relative to the fixed platen, a tie bar which is connected to one platen of the fixed platen or the movable platen and has a engaged part at a side of the other platen of the fixed platen and the movable platen, a clamping cylinder which is provided in the other platen and has a piston movable in the mold opening and closing direction inside it, a split nut device which is connected to the piston and can mesh with the engaged part, and a stopper device which restricts the movement of the split nut device toward the one platen side relative to the other platen. The stopper device has at least a driving unit and a stopper part which is driven in the mold opening and closing direction relative to the other platen by driving of the driving unit and can engage with the split nut device from the one platen side. No winding transmission mechanism is interposed between the driving unit and the stopper part.

Preferably, the stopper device further has a conversion mechanism which converts rotation of the driving unit to translational motion in the mold opening and closing direction, and the stopper part is driven in the mold opening and closing direction relative to the other platen by the translational motion of the conversion mechanism.

Preferably, the conversion mechanism has a pinion which is concentrically fixed to an output shaft of the driving unit; a nut gear which is formed in a ring shape surrounding a cylinder part of the clamping cylinder around the axis thereof, has a gear part meshing with the pinion on the outer circumferential side, and has a female screw part on the inner circumferential side; and a male screw part which is provided in the cylinder part and is screwed with the female screw part. The stopper part is configured by the surface of the nut gear which is on the opposite side to the one platen.

Preferably, the clamping device has plurality of the tie bars, a plurality of the stopper devices which are provided corresponding to the plurality of tie bars, and a control device which can independently control the driving units of the plurality of stopper devices.

Preferably, the clamping device has a control device which controls the clamping cylinder to move the piston to the opposite side from the one platen to separate the split nut device from the stopper part and controls the driving unit in that separated state to move the stopper part to a position calculated based on predetermined mold thickness information.

A molding apparatus according to one aspect of the present invention is provided with the above clamping device.

Advantageous Effects of Invention

According to the present invention, for example, play from the electric motor to the stopper part is reduced, therefore the relative positioning of the split nut devices and the engaged parts of the tie bars can be carried out with a high accuracy.

DESCRIPTION OF EMBODIMENTS

Configuration of Die Casting Machine

Figure 1:
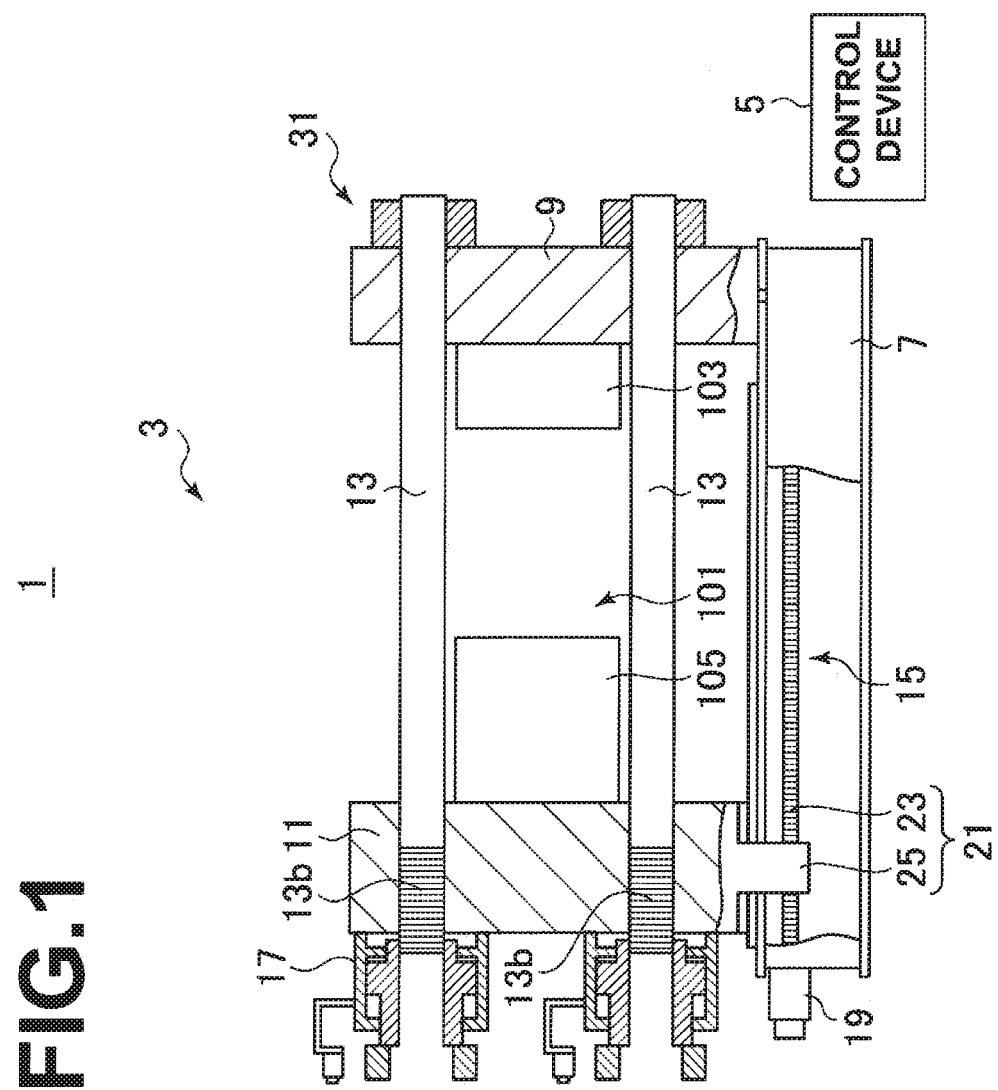
FIG. 1 is a schematic view showing the configuration of principal parts of a die casting machine according to an embodiment of the present invention in a mold opening state.
Figure 2:
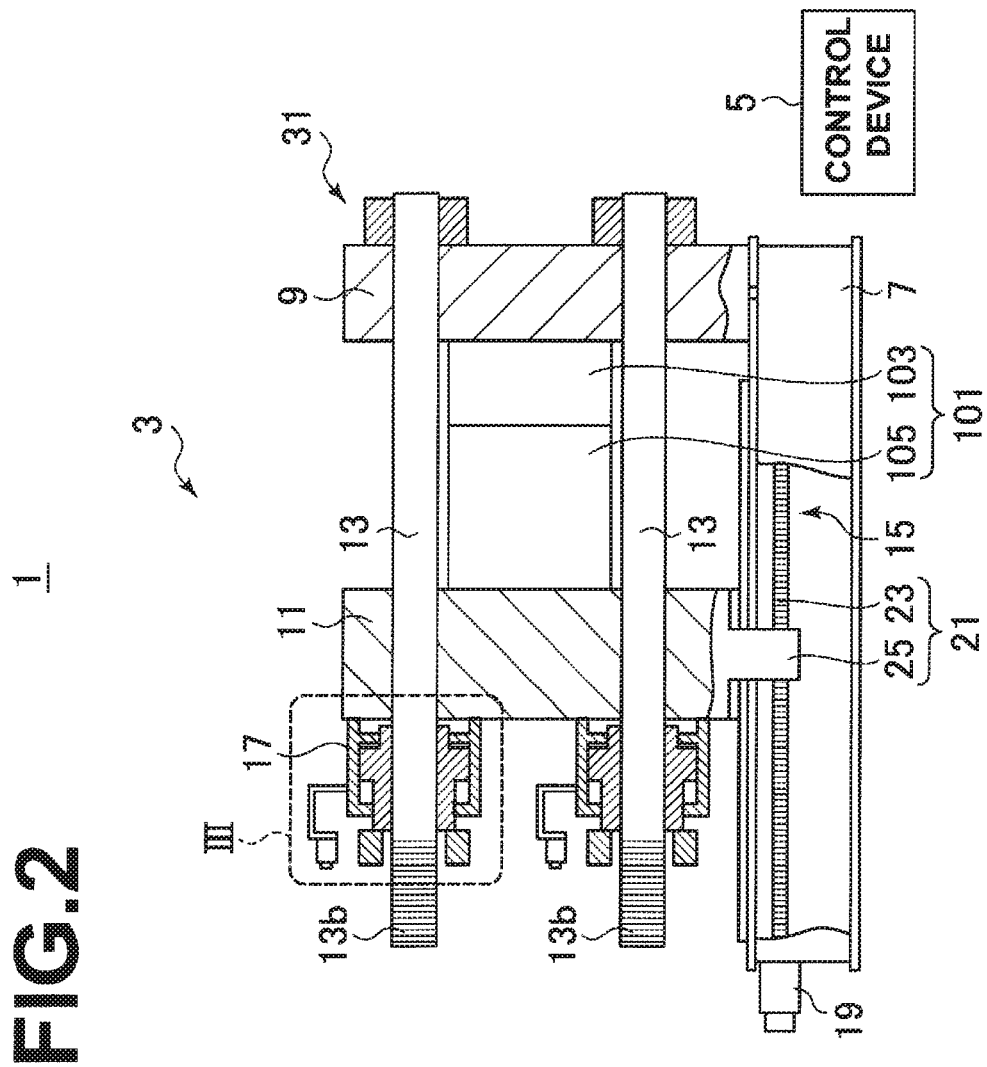
FIG. 2 is a schematic view showing the configuration of principal parts of the die casting machine in FIG. 1 in a mold closing state.

FIG. 1 and FIG. 2 are side views, partially including cross-sectional views, which show the configuration of principal parts of a die casting machine 1 according to an embodiment of the present invention. FIG. 1 shows a mold opening state of the die casting machine 1. FIG. 2 shows a mold closing state of the die casting machine 1.

The die casting machine 1 is an apparatus for injecting a molten metal (an example of the molding material) to an internal part of a mold (die) 101 including a fixed mold (die) 103 and movable mold (die) 105, solidifying the molten metal inside the mold 101, and thereby producing a die casting (an example of molded article).

The die casting machine 1 has for example a clamping device 3 which opens or close and clamps the mold 101, a not shown injection device which injects a molten metal into the mold 101, a not shown ejection device which ejects the die castings from the fixed mold 103 or movable mold 105, and a control device 5 which controls these devices.

The clamping device 3, for example, has a base 7, a fixed die plate 9 which is provided on the base 7 and holds the fixed mold 103, a movable die plate 11 which is provided on the base 7 and holds the movable mold 105, and a plurality of tie bars 13 which bridged the fixed die plate 9 and the movable die plate 11.

The base 7 is for example placed on a surface of a factory floor. The fixed die plate 9 and the movable die plate 11 are arranged on the base 7 so as to face each other. The fixed die plate 9 holds the fixed mold 103 on a mold attachment surface facing the movable die plate 11 and is fixed with respect to the base 7. On the other hand, the movable die plate 11 holds the movable mold 105 on the mold attachment surface facing the fixed die plate 9 and is provided so that it can move in the mold opening and closing direction (direction approaching/separating from the fixed die plate 9) relative to the base 7.

By movement of the movable die plate 11 in a direction approaching the fixed die plate 9 (mold closing direction), the mold 101 is closed (FIG. 2). Further, by the movement of the movable die plate 11 in a direction separating from the fixed die plate 9 (mold opening direction), the mold 101 is opened (FIG. 1).

As the tie bars 13, for example, a plurality are provided around the mold 101. Specifically, for example, four in total are provided at the four corners of the substantially rectangular fixed die plate 9 and movable die plate 11. The four tie bars 13 are for example arranged so as to be symmetric at the top and bottom and symmetric at the right and left around the mold 101. The tie bars 13 have lengths at least long enough to bridge the fixed die plate 9 and the movable die plate 11 in the mold closing state.

The parts (for example end parts) of the tie bars 13 on the fixed die plate 9 side are connected to the fixed die plate 9. Accordingly, in the mold closing state shown in FIG. 2, by pulling the parts (for example end parts) of the tie bars 13 on the movable die plate 11 side to the rear from the movable die plate 11 (the opposite side from the fixed die plate 9, i.e., left side on the drawing sheet in the figure), the tie bars 13 are extended, and a clamping force in accordance with the amounts of extension can be generated.

Note that, the tie bars 13 and the fixed die plate 9 may be connected by using screws etc. or by engagement devices which are provided on the fixed die plate 9 and can engage with the tie bars 13 in order to facilitate pullout of the tie bars 13 when changing the molds. Note, in any case, the tie bars 13 are maintained in the connected state with the fixed die plate 9 over a plurality of molding cycles.

The clamping device 3 is for example configured by a so-called composite type clamping device and separately has a driving means for opening and closing the molds and a driving means for clamping the molds. Specifically, the clamping device 3 for example has an electric mold opening and closing drive device 15 for opening and closing the molds and a clamping cylinder 17 for clamping the molds.

The mold opening and closing drive device 15 for example has a rotary electric motor 19 and a screw mechanism 21 for converting the rotation of the electric motor 19 to translational motion and transmitting the same to the movable die plate 11. The screw mechanism 21 is for example configured by a ball screw mechanism. It has a screw shaft 23 supported upon the base 7 and a nut 25 which is fixed to the movable die plate 11 and is screwed with the screw shaft 23 through a not shown ball.

The screw shaft 23 is arranged so as to extend in the mold opening and closing direction and is supported so that it can rotate around the axis and cannot move in the axial direction. The nut 25 is fixed to the movable die plate 11 and thereby cannot rotate around the axis but can move in the axial direction. When the rotation of the electric motor 19 is transmitted to the screw shaft 23 directly or indirectly through a suitable gear mechanism or the like and the screw shaft 23 is rotated, the nut 25 moves in the axial direction.

Due to this, the movable die plate 11 fixed to the nut 25 moves in the mold opening and closing direction.

The clamping cylinders 17 are for example provided behind the movable die plate 11. Further, a clamping cylinder 17 is for example provided for each tie bar 13. In the present embodiment, four in total are provided. By pulling the tie bars 13 by the clamping cylinders 17, the clamping force can be generated as explained above.

The control device 5 is, for example, though not particularly shown, configured by a computer including a CPU, ROM, RAM, external memory device, etc. The control device 5 controls operations of the clamping device 3, not shown injection device, not shown ejection device, and so on. For example, the control device 5 outputs control signals to drivers and/or hydraulic circuits (for example oil pressure circuits) of the drive devices of the above devices based on the information set in advance and signals of not shown sensors (position sensors or pressure sensors) etc.

Figure 3:
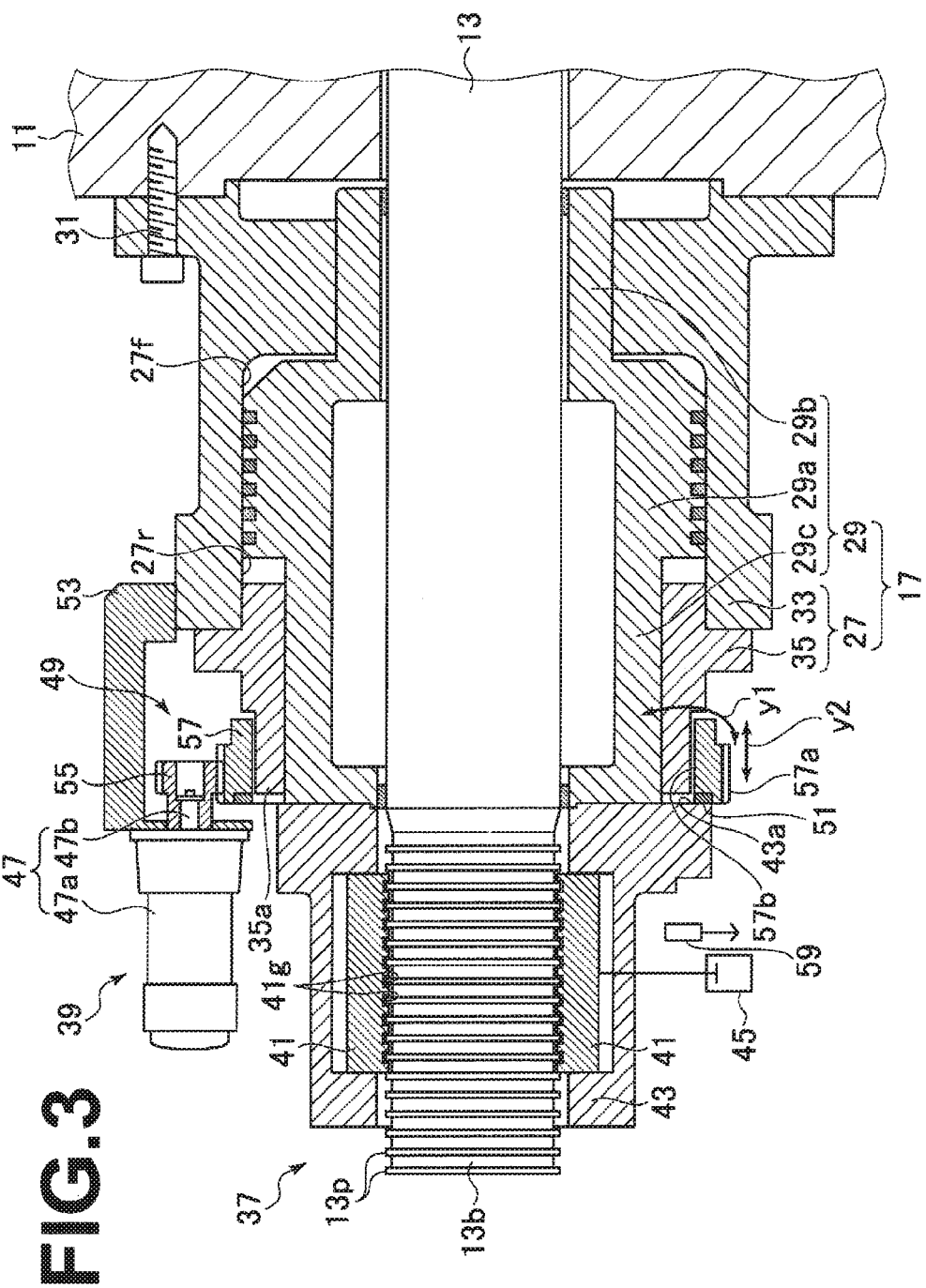
FIG. 3 is a cross-sectional view showing a region III in FIG. 2 enlarged.
Figure 4:
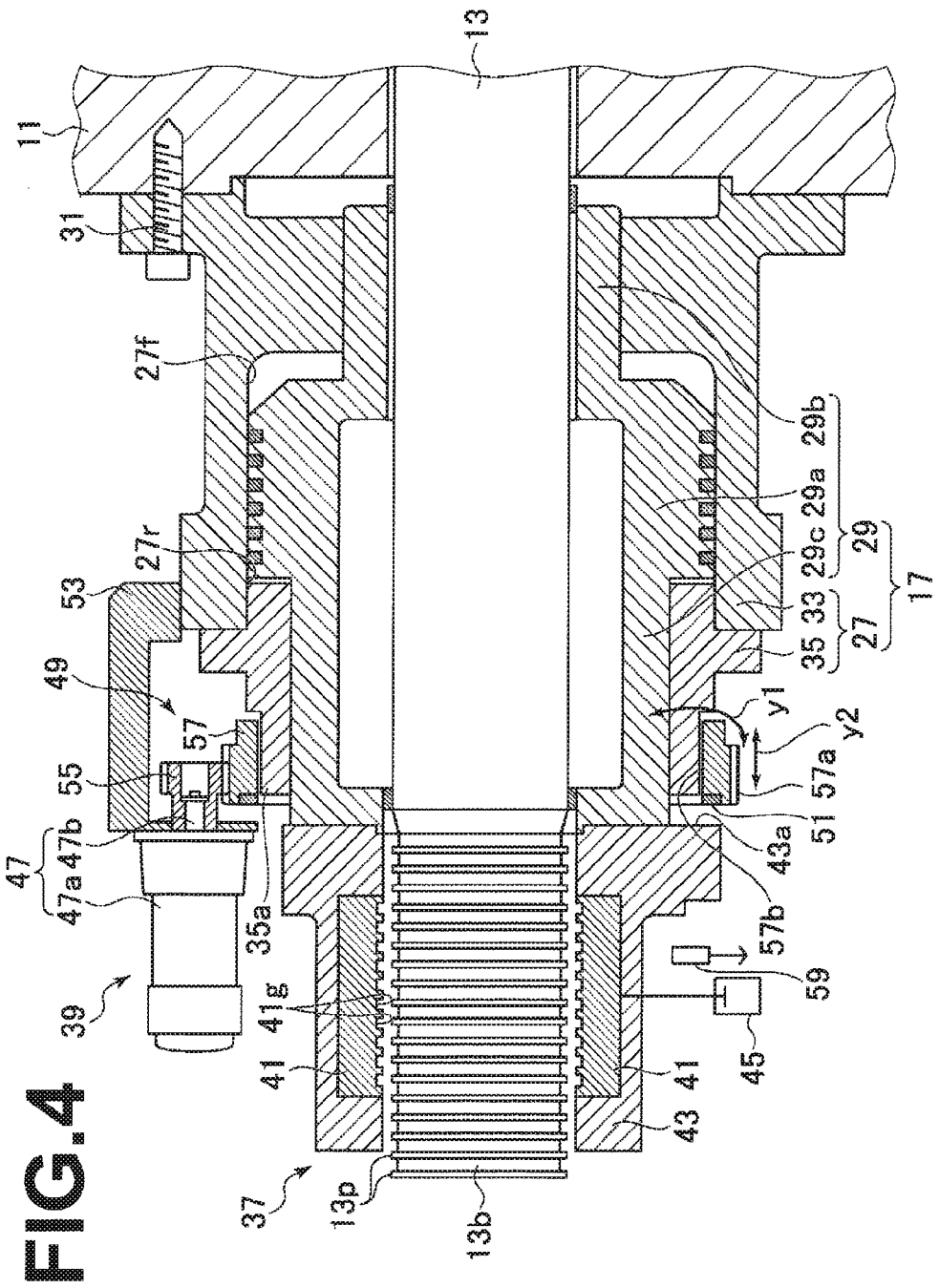
FIG. 4 is a cross-sectional view showing the region III in FIG. 2 in a state different from FIG. 3.

FIG. 3 is a cross-sectional view showing a region III in FIG. 2 enlarged. FIG. 4 is a cross-sectional view showing the region III in FIG. 2 in a state different from FIG. 3. Note that, in the following description, an explanation will be given concerning one clamping cylinder 17 among the four clamping cylinders 17, but the explanation is the same also for the other clamping cylinders 17.

The clamping cylinder 17 for example has a cylinder part 27 which is provided parallel to the mold opening and closing direction and a piston 29 which can slide in the cylinder part 27 in its axial direction (mold opening and closing direction). By engaging the piston 29 with a tie bar 13 and moving the piston 29 backward (to the opposite side from the fixed die plate 9, i.e., left side on the drawing sheet), the tie bar 13 can be pulled out.

The cylinder part 27 is for example configured in a substantially tubular shape and is fixed to the back of the movable die plate 11 by a screw 31. The cylinder part 27 may be configured by a suitable number of members in combination. For example, the cylinder part 27 includes a tube 33 in which the piston 29 slides and a cover 35 which is fixed to the back of the tube 33 (further, each of these members may be configured by two or more members as well).

The piston 29 for example has a piston body 29a partitioning the interior of the cylinder part 27 into two cylinder chambers (front side chamber 27f and rear side chamber 27r), a forward projection part 29b which projects forward from the cylinder part 27 (to the fixed die plate 9 side, i.e., right side on the drawing sheet), and a backward projection part 29c which projects backward from the cylinder part 27. In the axial center of the piston 29, the tie bar 13 is inserted so as to be movable in the axial direction with respect to the piston 13. The piston 29 may be configured by a suitable number of members.

By selectively supplying hydraulic fluid (for example oil) to the front side chamber 27f and the back side chamber 27r, the piston 29 can be driven in the mold opening and closing direction. By inserting the tie bar 13 into the piston 29, for example, the force of the mold opening and closing direction can be transmitted from the piston 29 to the tie bar 13 while suppressing generation of unnecessary moment. The forward projection part 29b and backward projection part 29c contribute to for example suppression of inclination of the piston 29 relative to the cylinder part 27 and tie bar 13 and suppression of leakage of hydraulic fluid of the front side chamber 27f and rear side chamber 27r. The backward projection part 29c contributes to also the engagement of the tie bar 13 and the piston 29 as will be explained later.

The clamping device 3, in addition to the configuration explained above, has a half nut device 37 which engages and disengages the tie bar 13 and the piston 29 and a stopper device 39 for stabilizing the engagement (meshing) of the half nut device 37.

In the half nut device 37, the configuration for realizing its basic operating principle may be made the same as a known configuration. For example, the half nut device 37 has a pair of half nuts 41 which face each other, a support member 43 which supports the pair of half nuts 41 so that they can move in their opening and closing direction (direction approaching/separating from each other), and a nut opening and closing cylinder 45 for driving the half nuts 41 in the opening and closing direction. Note that, the nut opening and closing cylinder 45 may be defined as a device different from the half nut device as well.

On the inner circumferential sides of the half nuts 41, pluralities of engagement grooves 41g are formed. On the other hand, on the outer circumferential surface of the part (for example end part) of the tie bar 13 on the movable die plate 11 side, an engaged part 13b having a plurality of projections 13p (a plurality of grooves between them from another viewpoint) fitting in the plurality of engagement grooves 41g is formed. Accordingly, when the half nuts 41 are closed in the state where the engaged part 13b is positioned between the pair of half nuts 41, the half nuts 41 and the engaged part 13b mesh with each other (FIG. 3). Due to this, the half nut device 37 and the tie bar 13 are engaged in the mold opening and closing direction. Further, by opening the half nuts 41, the engagement is released (FIG. 4).

Each engagement groove 41g (and each projection 13p) for example extends so as to circle the tie bar 13 in a plane perpendicular to the tie bar 13. Further, the plurality of engagement grooves 41 (and plurality of projections 13p) have the same shapes as each other and are arranged along the tie bar 13 at a constant pitch. The pitch of the plurality of engagement grooves 41 (and plurality of projections 13p) may be suitably set. As an example, it is about 30 mm. Note that, in FIG. 3 and FIG. 4, the engagement grooves 41g (and projections 13p) are given a shape symmetric in the mold opening and closing direction. However, they may also be given an asymmetric shape like a saw blade. Further, the engagement grooves 41g (and projections 13p) need not extend so as to be perpendicular to the tie bar 13, but may spirally extend as well.

The support member 43 supports the half nuts 41 so that they can move in their opening and closing direction (direction perpendicular to the mold opening and closing direction) relative to the support member 43 and supports the half nuts 41 so that they cannot move in the mold opening and closing direction relative to the support member 43. Further, the support member 43 for example is fixed to the rear part (backward projection part 29c) of the piston 29 of the clamping cylinder 17 by not shown screws etc. Accordingly, when the half nuts 41 and the engaged part 13b of the tie bar 13 mesh with each other as explained above, the piston 29 and the tie bar 13 are engaged in the mold opening and closing direction. Due to this, for example, it becomes possible to pull the tie bar 13 by driving of the piston 29 and generate a clamping force.

The nut opening and closing cylinder 45 is configured by a hydraulic cylinder or air pressure cylinder. The pair of half nuts 41 are for example connected by a not shown connection mechanism and driven in their opening and closing direction by one nut opening and closing cylinder 45. Note that, the nut opening and closing cylinder 45 may be provided for each half nut 41 as well. Further, in place of the cylinder, an electric motor or another suitable drive device may be provided as well.

The half nuts 41 and the engaged part 13b of the tie bar 13 must be adjusted in relative positions in the mold opening and closing direction with a distance less than the pitch of the plurality of engagement grooves 41g before the half nuts 41 are closed so that they suitably mesh with each other (so that the engagement grooves 41g and the projections 13p face each other, but the engagement grooves 41g and the grooves between the projections 13p do not face each other).

Here, in the mold closing state (FIG. 2), the movable die plate 11 faces the fixed die plate 9 by a distance in accordance with the mold thickness (thickness of the mold 101). The tie bar 13 is connected to the fixed die plate 9, therefore the relative positions of the movable die plate 11 and the engaged part 13b in the mold opening and closing direction in the mold closing state are determined in accordance with the mold thickness. Consequently, in the mold closing state, the positions in the mold opening and closing direction of the half nuts 41 relative to the movable die plate 11 where the half nuts 41 and the engaged part 13b can mesh with each other are determined in accordance with the mold thickness.

Therefore, in the present embodiment, in the mold closing state, the stopper device 39 positions the half nuts 41 (piston 29) relative to the movable die plate 11 (cylinder part 27) at constant positions which are determined based on the mold thickness. Due to this, the half nuts 41 and the engaged part 13b are adjusted to positions where they can mesh with each other. The configuration of the stopper device 39 is as follows.

The stopper device 39 for example has a rotary electric motor 47, a transmission mechanism 49 which converts rotation of the electric motor 47 to translational motion in the mold opening and closing direction, and a stopper part 51 which is driven in the mold opening and closing direction by the translational motion of the transmission mechanism 49 and can engage with the half nut device 37.

The electric motor 47 for example has a motor body 47a and an output shaft 47b which extends out of the motor body 47a. The motor body 47a, although not particularly shown, has a stator including either of a field magnet or armature and has a rotor which includes the other of the field magnet and the armature and can rotate with respect to the stator. The output shaft 47b is fixed to the rotor and rotates around its axis.

The electric motor 47 for example has a not shown encoder and configures a servo mechanism together with a not shown servo driver (servo amplifier). Note, the electric motor 47 may be configured by a stepping motor or the like as well. Further, the electric motor 47 may be equipped with a brake as well. At the time of stopping the electric motor 47, which will be explained later, the electric motor 47 is set to for example a torque-free state. Note, a brake of an electric motor with a brake may be utilized as well.

The electric motor 47 is for example arranged so that the output shaft 47b becomes parallel to the mold opening and closing direction. More specifically, the electric motor 47 is for example arranged so that the output shaft 47b is oriented to the fixed die plate 9 side. Due to this, the outer circumferential surface of the output shaft 47b can be made to approach the outer circumferential surface of the clamping cylinder 17 while space for arrangement of the motor body 47a can be secured at the back of the clamping cylinder 17 (on the opposite side to the fixed die plate 9). The motor body 47a (stator) is for example fixed to the cylinder part 27 of the clamping cylinder 17 through a suitable connection member 53.

The transmission mechanism 49 has, from the electric motor 47 side, for example, a pinion 55, nut gear 57, and male screw part 35a in that order. That is, the transmission mechanism 49 is for example configured by a gear mechanism.

The pinion 55 is a so-called "external gear" and "spur gear" and has a plurality of teeth cut in a direction parallel to the axis (mold opening and closing direction) on its outer circumferential surface. The pinion 55 is concentrically fixed to the output shaft 47b of the electric motor 47 and rotates together with the output shaft 47b around the axis.

The nut gear 57 is a ring-shaped member which surrounds the cylinder part 27 (cover 35) of the clamping cylinder 17 about its axis. The nut gear 57 has a gear part 57a on the outer circumferential side and has a female screw part 57b on the inner circumferential side.

The gear part 57a is a so-called "external gear" and "spur gear", and has a plurality of teeth cut in a direction parallel to the axis (mold opening and closing direction) on its outer circumferential surface. The axis of the gear part 57a and the axis of the pinion 55 are parallel, and the gear part 57a and the pinion 55 mesh with each other. Accordingly, when the pinion 55 rotates about its axis, that rotation is transmitted to the gear part 57a, and the nut gear 57 rotates around the axis thereof. Further, the two parts are spur gears, therefore they can relatively move in the axial direction while maintaining the meshing.

The number of teeth of the gear part 57a is for example larger than the number of teeth of the pinion 55. Accordingly, the rotation of the pinion 55 (output shaft 47b) is slowed and transmitted to the gear part 57a. As a result, for example, the driving force of the electric motor 47 which is necessary for driving the gear part 57a can be made smaller or the control of the rotation position of the gear part 57a can be made higher in precision.

The face widths of the gear part 57a and the pinion 55 (length of the teeth in the axial direction (mold opening and closing direction)) can be suitably set. For example, the face widths of the gear part 57a and the pinion 55 are set so that the distance over which the two gears can relatively move in the axial direction while maintaining the meshing becomes the pitch of the engagement grooves 41g or more (preferably 2 pitches or more). Further, for example, the face width of the gear part 57a is longer than the face width of the pinion 55. Note that, the nut gear 57 is a member which preferably has a certain degree of length in the axial direction since it has the female screw part 57b on the inner circumferential side and can easily secure the face width.

The female screw part 57b is configured by cutting thread grooves in the inner circumferential surface. The lead angle or pitch etc. thereof may be suitably set. Note, as will be explained later, at the time of positioning of the half nut device 37, force in the axial direction is applied from the half nut device 37 to the nut gear 57. Therefore, the lead angle is preferably made small to a certain extent so that the nut gear 57 will not move in the axial direction accompanied with rotation at the above time.

The male screw part 35a is configured by a part of the cylinder part 27 (cover 35). That is, the male screw part 35a is configured by cutting thread grooves in the outer circumferential surface of the cylinder part 27. The male screw part 35a is a part of the cylinder part 27, therefore, with respect to the movable die plate 11, it cannot move in the mold opening and closing direction and cannot rotate around the axis thereof. Then, the male screw part 35a is screwed with the female screw part 57b of the nut gear 57.

Accordingly, when the nut gear 57 is rotated (arrow y1), the nut gear 57 moves in the mold opening and closing direction (arrow y2) relative to the cylinder part 27 (movable die plate 11). That is, the rotation transmitted to the nut gear 57 is converted to translational motion of the nut gear 57. The distance in which screwing of the male screw part 35a and female screw part 57b is maintained (stroke of translational motion) may be suitably set, but for example is not less than the pitch of the engagement grooves 41g.

Note that, the screw mechanism configured by the female screw part 57b and male screw part 35a is for example preferably a so-called sliding screw mechanism where the female screw part 57b and the male screw part 35a slide. This is from the viewpoint of reducing the liability of the nut gear 57 moving in the axial direction accompanied with rotation when force in the axial direction is applied from the half nut device 37 to the nut gear 57. Note, when such liability is sufficiently low, there is no problem even when the screw mechanism is a ball-screw mechanism in which a ball is interposed between the female screw part 57b and the male screw part 35a.

The stopper part 51 is for example configured by a back surface of the nut gear 57 (the surface on the opposite side from the fixed die plate 9, i.e., the surface on the left side on the drawing sheet in the figure). Note that, in the figure, the stopper part 51 is configured by a member different from the other part of the nut gear 57. However, the stopper part 51 may be formed integrally with the other parts as well. In the case where the stopper part 51 is configured by a member different from the other parts, preferably the stopper part 51 is for example formed so that the coefficient of restitution becomes lower than that in the other parts. The stopper part 51 is for example provided over the entire circumference of the nut gear 57.

On the other hand, the support member 43 of the half nut device 37 has an abutted part 43a which is configured by broadening of the front end face (surface on the fixed die plate 9 side) to the outer circumferential side more than the rear end face of the cylinder part 27 of the clamping cylinder 17.

Accordingly, the support member 43 abuts against the stopper part 51 at the fixed die plate 9 side. Due to this, the relative movement with respect to the movable die plate 11 (cylinder part 27) of the half nut device 37 (piston 29) toward the fixed die plate 9 side is restricted. If the stopper part 51 is positioned in advance at a suitable position in the mold opening and closing direction by driving and stopping the electric motor 47 and hydraulic fluid is supplied to the rear side chamber 27r of the clamping cylinder 17 to move the piston 29 to the fixed die plate 9 side, the half nut device 37 can be stably positioned at a constant position relative to the movable die plate 11.

The abutted part 43a is for example provided so as to face (abut against) substantially the entire circumference of the nut gear 57. However, on the side where the electric motor 47 is provided, the abutted part 43a is not provided in order to secure space for arrangement of the electric motor 47. The abutted part 43a is for example provided over half of the circumference about the axis of the nut gear 57, more preferably over ¾ of the circumference.

Note that, FIG. 3 and FIG. 4 are schematic views, therefore the support member 43 is indicated by one hatching. In actuality, however, the support member 43 may be configured by a plurality of members. For example, the support member 43 may include a member supporting the half nuts 41 so that they can move in the opening and closing direction thereof and a member which is interposed between this member and the piston 29 and fastens the two and has the abutted part 43a as well (further, each of these members may be configured by two or more members as well).

Further, in the present embodiment, the half nut device 37 and the piston 29 are connected and move together, therefore the abutted part 43a can be grasped as a part of the half nut device 37 or can be grasped as a part of the piston 29. In the present application, for convenience, the explanation is given considering the abutted part 43a as a part of the half nut device 37.

In addition to the above configuration, on the periphery of the clamping cylinder 17, the clamping device 3 has a position sensor 59 which is provided on the movable die plate 11 and detects the position of the piston 29 (half nut device 37) in the mold opening and closing direction. The position sensor 59 may be one configuring a magnetic or optical linear encoder together with a not shown scale part provided in a fixed manner in the piston 29 or may be one configured by a laser length measuring device and measuring a distance from the part which is provided in a fixed manner in the piston 29. The results of detection of the position sensor 59 are output to the control device 5.

As already explained, the configuration shown in FIG. 3 and FIG. 4 is provided in each of the plurality of tie bars 13. The control device 5 can use the detection value of the position sensor 59 provided in each piston 29 as the basis to specify the position of each half nut device 37 as will be explained later. Further, the control device 5 can output control signals to the electric motors 47 (not shown drivers corresponding to the electric motors 47) independently from each other. Accordingly, the meshing between the half nut device 37 and the engaged part 13b may be adjusted independently for each tie bar 13.

Operation of Die Casting Machine

The operation of the die casting machine 1 having the above configuration will be explained.

Operation in Molding Cycle

First, the operation of the die casting machine 1 in the molding cycle will be explained.

In the molding cycle, as already explained, the tie bars 13 are maintained in the state where they are connected with the fixed die plate 9. At the start of the molding cycle, for example, as shown in FIG. 1, the die casting machine 1 is made the mold opening state. That is, the movable die plate 11 is positioned at the mold opening position, and the fixed mold 103 and the movable mold 105 are separated. The half nuts 41 are opened, and the pistons 29 and the tie bars 13 of the clamping cylinders 17 are not engaged with each other.

From the mold opening state in FIG. 1, the control device 5 outputs a control signal to a not shown driver driving the electric motor 19 of the mold opening and closing drive device 15 so as to move the movable die plate 11 in the mold closing direction. When the movable die plate 11 moves in the mold closing direction, as shown in FIG. 2, the movable mold 105 contacts the fixed mold 103 and a mold closing state is exhibited.

The control device 5 controls a not shown hydraulic circuit so that hydraulic fluid is supplied to the rear side chambers 27r of the clamping cylinders 17 under a suitable pressure from a suitable timing before the mold closing state is achieved or after the mold closing state is achieved. Due to this, the pistons 29 of the clamping cylinders 17 and the half nut devices 37 connected to the pistons 29 are rendered a state where the abutted parts 43a of the half nut devices 37 advance up to the positions where they abut against the stopper parts 51. The positions of the stopper parts 51 at this time are set based on the thickness of the mold 101 which is held by the clamping device 3 at present and are made positions where the half nuts 41 and the engaged parts 13b of the tie bars 13 can mesh.

Next, the control device 5 outputs a control signal to a not shown hydraulic (or air pressure) circuit for controlling supply and discharge of hydraulic fluid (or air) with respect to the nut opening and closing cylinders 45 so that the half nuts 41 are closed. Due to this, the pistons 29 of the clamping cylinders 17 and the tie bars 13 are engaged with each other in the mold opening and closing direction.

Next, the control device 5 controls a not shown hydraulic circuit so as to supply hydraulic fluid to the front side chambers 27f of the clamping cylinders 17. Due to this, the pistons 29 of the clamping cylinders 17 move to the side opposite to the fixed die plate 9, and the tie bars 13 are pulled. Further, a clamping force in accordance with the amount of extension of the tie bars 13 is generated. Note that, at this time, the abutted parts 43a of the half nut devices 37 are separated from the stopper parts 51 (although the half nut 41 is the opening state, see FIG. 4).

The control device 5 detects the clamping force according to a suitable method. For example, the control device 5 acquires amounts of extension of the tie bars 13 by the position sensors 59 and consequently acquires the clamping force. Further, for example, the control device 5 may acquire the clamping force based on the results of detection of not shown pressure sensors for detecting the pressure of the front side chambers 27f as well.

When the clamping force reaches a predetermined value and the mold clamping is finished, the control device 5 controls a not shown injection device so as to supply the molten metal into the mold 101. The molten metal injected into the mold 101 solidifies and forms a die casting.

After that, the control device 5 controls a not shown hydraulic circuit so as to connect the front side chambers 27f and a not shown tank and release the pressure of the front side chambers 27f. Due to this, the extension of the tie bars 13 is released, and the abutted parts 43a of the half nut devices 37 abut against the stopper parts 51.

Next, the control device 5 opens the half nuts 41 and disengages the pistons 29 and the tie bars 13. Next, the control device 5 moves the movable die plate 11 to the mold opening position shown in FIG. 1. After that, preparations are made for the next cycle such as washing of the mold 101 or coating of a parting agent is carried out.

Operation in Position Adjustment of Stoppers

Figure 5:
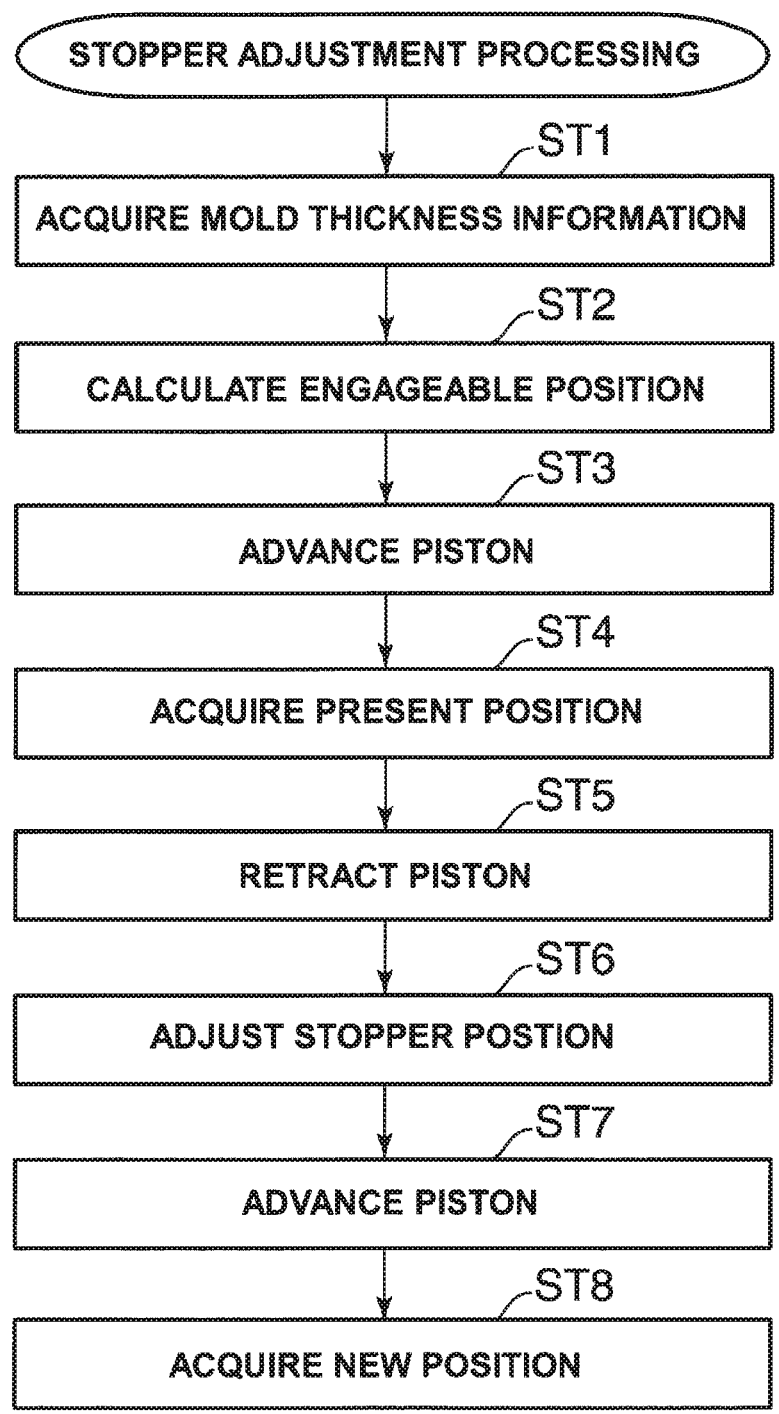
FIG. 5 is a flow chart showing a procedure of processing for position adjustment of the stopper which is executed by the die casting machine in FIG. 1.

FIG. 5 is a flow chart showing a procedure of the processing for the position adjustment of a stopper executed by the die casting machine 1. This processing is for example carried out at the time of changing molds or the time of working of the die casting machine 1 (before the plurality of molding cycles).

First, at step ST1, the control device 5 acquires the information of the mold thickness of the mold 101 which is held (or is scheduled to be held) by the clamping device 3 at present. The information may be for example input through a not shown input device by a worker or may be read out from a storage medium or a computer connected through a network.

At step ST2, the control device 5 uses the acquired mold thickness as the basis to calculate the positions of the half nuts 41 (piston 29, stopper part 51) relative to the movable die plate 11 (cylinder part 27) at which the half nuts 41 and the engaged part 13b can mesh with each other. The specific method of calculation may be suitably set.

Giving one example, the control device 5 holds the information of the pitch of the engagement grooves 41g of the half nuts 41, information of the predetermined standard mold thickness, and information of the position (standard position) of the stopper part 51 relative to the movable die plate 11 at which the half nuts 41 and the engaged part 13b can mesh with each other when the molds contact in the case of this standard mold thickness. Further, it acquires a value (surplus) of the decimal point or less when dividing a difference between the acquired mold thickness and the standard mold thickness by the pitch. Further, the value of the decimal point or less is added to the standard position to calculate the position of the stopper part 51 relative to the movable die plate 11 at which the half nuts 41 can mesh with the engaged part 13b.

At step ST3, the control device 5 supplies hydraulic fluid to the rear side chamber 27r to move the piston 29 forward and establish a state where the abutted part 43a of the half nut device 37 abuts against the stopper part 51.

At step ST4, the control device 5 acquires the detection value of the position sensor 59. The abutted part 43a abuts against the stopper part 51 according to step ST3. Therefore, the position sensor 59 which detects the position of the half nut device 37 (piston 29) relative to the movable die plate 11 (cylinder part 27) indirectly detects the position of the stopper part 51 relative to the movable die plate 11. That is, the position sensor 59 detecting the amount of extension (clamping force) of the tie bars 13 is also used for the mold thickness adjustment.

At step ST5, the control device 5 supplies hydraulic fluid to the front side chamber 27f to move the piston 29 backward and separates the abutted part 43a of the half nut device 37 from the stopper part 51. Note that, the movement distance of the piston 29 at this time may be suitably set, but for example the piston 29 moves up to the backward limit.

At step ST6, the control device 5 controls the electric motor 47 so as to move the stopper part 51 up to the position calculated at step ST2. At this time, for example, the control device 5 acquires the number of rotation of the electric motor 47 from the encoder of the electric motor 47, converts this number of rotation to an amount of movement of the stopper part 51 by a predetermined conversion formula, and adds this amount of movement to the position of the stopper part 51 acquired at step ST4 to thereby acquire the position of the stopper part 51.

At step ST7, the control device 5, in the same way as step ST3, supplies hydraulic fluid to the rear side chamber 27r to move the piston 29 forward and establishes a state where the abutted part 43a of the half nut device 37 abuts against the stopper part 51.

At step ST8, the control device 5, in the same way as step ST4, acquires the detection value of the position sensor 59. Then, the control device 5 judges whether that detected position and the position calculated at step ST2 match (whether the difference is less than a predetermined threshold value). When they do not match, it means some sort of abnormality has occurred. Therefore, for example, a warning is displayed to the worker through a not shown display device.

As described above, in the present embodiment, the clamping device 3 has the fixed die plate 9, the movable die plate 11 which can move in the mold opening and closing direction relative to the fixed die plate 9, the tie bars 13 which are connected to one die plate (fixed die plate 9 in the present embodiment) and have engaged parts 13b at the other die plate (movable die plate 11 in the present embodiment) side, clamping cylinders 17 which are provided on the other die plate (movable die plate 11) and have the pistons 29 movable in the mold opening and closing direction inside them, the half nut devices 37 which are connected to the pistons 29 and can mesh with the engaged parts 13b, and the stopper devices 39 which restrict the movement of the half nut devices 37 toward the one die plate (fixed die plate 9) side relative to the other die plate (movable die plate 11). The stopper device 39 at least has the electric motor 47, and the stopper part 51 which is driven in the mold opening and closing direction relative to the other die plate (movable die plate 11) by driving the electric motor 47 and can engage with the half nut device 37 from the one die plate (fixed die plate 9) side, and the winding transmission mechanism having a belt and/or chain is not interposed between the electric motor 47 and the stopper part 51.

Accordingly, as already explained, in the mold closing state, hydraulic fluid is supplied to the rear side chambers 27r to bias the pistons 29 (half nut devices 37) to the fixed die plate 9 side relative to the cylinder parts 27 (movable die plate 11), on the other hand, movement of the half nut devices 37 to the fixed die plate 9 side relative to the movable die plate 11 is restricted by the stopper parts 51 positioned by driving and stopping the electric motors 47, therefore the meshing adjustment of the half nut devices 37 and the engaged parts 13b can be conveniently and stably executed. Further, for example, no winding transmission mechanisms having a belt and/or chain are provided between the electric motors 47 and the stopper parts 51, so the play is relatively small. As a result, for example, high precision position control of the electric motors can be used to position the stopper parts 51 with a high precision and in turn the meshing adjustment is executed with a high precision. Further, by raising the precision of the meshing adjustment, for example, it is possible to reduce damage to the half nuts 41 and the engaged parts 13b. Further, in the present embodiment, the pistons 29 and the half nut devices 37 are connected, therefore no mechanism is necessary for bringing the half nut devices 37 into press-contact with the pistons 29 (see Patent Literature 3). Further, the stopper parts 51 do not abut against the pistons 29 to restrict the movement of the pistons 29 (see Patent Literature 3), but can abut against the half nut devices 37 to restrict the movement of the pistons 29. As a result, the structure can be simplified as a whole.

Further, in the present embodiment, the transmission mechanisms 49 have the pinions 55 which are concentrically fixed to the output shafts 47b of the electric motors 47, the nut gears 57 which are formed in ring shapes surrounding the cylinder parts 27 of the clamping cylinders 17 around their axes, have gear parts 57a meshed with the pinions 55 on the outer circumferential sides, and have female screw parts 57b on the inner circumferential sides, and male screw parts 35a which are provided on the cylinder parts 27 and are screwed with the female screw parts 57b. The stopper parts 51 are configured by the surfaces of the nut gears 57 which are on the opposite side from the one die plate (fixed die plate 9).

Accordingly, for example, the overall transmission mechanisms 49 have simple configurations and small sizes. On the other hand, it is possible to make the diameters of the nut gears 57 receiving the force from the half nut devices 37 larger. By making it possible to enlarge the diameter, for example, it is possible to disperse the force acting upon the half nut devices 37 or nut gears 57 over a broad range and stably receive a large force. Further, reduction of the lead angle can be facilitated. As a result, for example, the meshing adjustment is stabilized. Further, for example, since a large force can be received, after the molten metal solidifies, when releasing the pressure of the front side chambers 27f, even an impact from the half nut devices 37 to the stopper parts 51 due to contraction of the tie bars 13 can be withstood.

Further, in the present embodiment, the clamping device 3 has a plurality of tie bars 13, a plurality of stopper devices 39 provided corresponding to the plurality of tie bars 13, and the control device 5 which can independently control the electric motors 47 of the plurality of stopper devices 39.

Accordingly, for example, in a case where the meshing position between the half nut device 37 and the engaged part 13b is slightly different among the plurality of tie bars 13 due to inclination etc. of the fixed die plate 9 or movable die plate 11, it is possible to optimally execute the meshing adjustment for each tie bar 13.

Further, in the present embodiment, the clamping device 3 has the control device 5. The control device 5 controls the clamping cylinders 17 to move the pistons 29 to the sides opposite to the one die plate (fixed die plate 9) to separate the half nut devices 37 from the stopper parts 51 (step ST5) and controls the electric motors 47 in that separation state to move the stopper parts 51 to the positions calculated based on the predetermined mold thickness information (step ST6).

Accordingly, for example, when adjusting the positions of the stopper parts 51 by the electric motors 47, the sliding friction etc. of the pistons 29 do not become load of the electric motors 47. As a result, for example, the electric motors 47 can be reduced in size and the cost can be reduced.

The present invention is not limited to the above embodiment and may be executed in various ways.

The molding machine (molding apparatus) is not limited to a die casting machine. For example, the molding machine may be another metal molding machine, may be an injection molding machine for molding a resin, and may be a molding machine for molding a material obtained by mixing a thermoplastic resin or the like with sawdust. Further, the molding machine is not limited to horizontal clamping and horizontal injection. For example, it may be vertical clamping and vertical injection, horizontal clamping and vertical injection, or vertical clamping and horizontal injection.

The clamping device is not limited to a device wherein clamping cylinders, split nut devices, and stopper devices are provided on the movable die plate side. Conversely to the embodiment, the clamping cylinders, split nut devices, and stopper devices may be provided on the fixed die plate side as well. Note that, in this case, the tie bars are connected to the movable die plate over a plurality of molding cycles and move together with the movable die plate in the mold opening and closing operation.

Note that, in the above embodiment, the die casting machine 1 is an example of the molding apparatus. The fixed die plate 9 is an example of one die plate, an example of one platen, an example of the other die plate, and an example of the other platen. The movable die plate 11 is an example of the other die plate, an example of the other platen, an example of one die plate, and an example of one platen. The half nut device 37 is an example of the split nut device. The electric motor 47 is an example of a driving unit. The transmission mechanism 49 is an example of the conversion mechanism.

The stopper device is not limited to a device having a rotary driving unit, conversion mechanism, and stopper part. For example, the stopper device may be configured so that it has at least a linear driving unit and stopper part, the stopper part is driven in the mold opening and closing direction relative to the movable platen by driving the linear driving unit, and can engage with the split nut device from the fixed platen side.

That is, the stopper device is sufficient so far as it has at least a driving unit and stopper part and does not have a conversion mechanism etc. having a relatively large play like a winding transmission mechanism and interposed between the driving unit and the stopper part.

The mold opening and closing device of the clamping device need not be an electric type and may be a hydraulic cylinder for opening and closing the mold as well. The clamping cylinder need not be connected to the die plate and may be built in the die plate. The split nut device is not limited to a half nut device and may be a nut device divided into a suitable number of sections. The transmission mechanism between the electric motor and the stopper part may be suitably changed to one other than that shown in the embodiment.

Priority is claimed on Japanese application No. 2014-247983, filed on Dec. 12, 2014, the content of which is incorporated herein by reference.

REFERENCE SIGNS LIST

1 . . . die casting machine, 3 . . . clamping device, 9 . . . fixed die plate (one die plate, one platen, other die plate, other platen), 11 . . . movable die plate (other die plate, other platen, one die plate, one platen), 13 . . . tie bar, 13*b* . . . engaged part, 17 . . . clamping cylinder, 29 . . . piston, 37 . . . half nut device (split nut device), 39 . . . stopper device, 47 . . . electric motor (driving unit), 49 . . . transmission mechanism (conversion mechanism), 51 . . . stopper part, 103 . . . fixed mold, and 105 . . . movable mold.

The invention claimed is:

1. A clamping device comprising
   a fixed platen,
   a movable platen movable in a mold opening and closing direction relative to the fixed platen,
   a tie bar which is connected to one platen of the fixed platen or the movable platen and has an engaged part at a side of the other platen of the fixed platen and the movable platen,
   a clamping cylinder which is provided in the other platen and has a piston movable in the mold opening and closing direction inside it,
   a split nut device which is connected to the piston and can mesh with the engaged part, and
   a stopper device which restricts the movement of the split nut device toward said one platen side relative to the other platen, wherein the stopper device has at least
   a driving unit and
   a stopper part which is driven in the mold opening and closing direction relative to the other platen by driving of the driving unit and can engage with the split nut device from said one platen side and
   wherein no winding transmission mechanism is interposed between the driving unit and the stopper part.

2. The clamping device according to claim 1, wherein
   the stopper device further has a conversion mechanism which converts rotation of the driving unit to translational motion in the mold opening and closing direction, and
   the stopper part is driven in the mold opening and closing direction relative to the other platen by the translational motion of the conversion mechanism.

3. The clamping device according to claim 2, wherein
   the conversion mechanism has
      a pinion which is concentrically fixed to an output shaft of the driving unit,
      a nut gear which is formed in a ring shape surrounding a cylinder part of the clamping cylinder around the axis thereof, has a gear part meshing with the pinion on the outer circumferential side, and has a female screw part on the inner circumferential side, and
      a male screw part which is provided in the cylinder part and is screwed with the female screw part, and
   the stopper part is configured by the surface of the nut gear which is on the opposite side to said one platen.

4. The clamping device according to claim 1, further comprising
   a plurality of the tie bars,
   a plurality of the stopper devices which are provided corresponding to the plurality of tie bars, and
   a control device which can independently control the driving units of the plurality of stopper devices.

5. The clamping device according to claim 1, further comprising a control device which controls the clamping cylinder to move the piston to the opposite side from said one platen to separate the split nut device from the stopper part and controls the driving unit in that separated state to move the stopper part to a position calculated based on predetermined mold thickness information.

6. A molding apparatus comprising the clamping device according to claim 1.

\* \* \* \* \*